April 14, 1970  E. B. AMBROSE  3,505,760

WATERING DEVICE FOR XMAS TREES

Filed March 27, 1968  2 Sheets-Sheet 1

INVENTOR.
EDWARD B. AMBROSE
BY
Harbaugh & Thomas
Attys

April 14, 1970  E. B. AMBROSE  3,505,760
WATERING DEVICE FOR XMAS TREES
Filed March 27, 1968  2 Sheets-Sheet 2

INVENTOR.
EDWARD B. AMBROSE
BY
Harbaugh and Thomas
attys

United States Patent Office 3,505,760
Patented Apr. 14, 1970

3,505,760
WATERING DEVICE FOR XMAS TREES
Edward B. Ambrose, 103 Mayfair Place,
Chicago Heights, Ill. 60411
Filed Mar. 27, 1968, Ser. No. 716,565
Int. Cl. A47g 33/12
U.S. Cl. 47—38                                6 Claims

ABSTRACT OF THE DISCLOSURE

A water feeder having a somewhat conical funnel portion, securable to a stand supporting the trunk of a Xmas tree with the butt end thereof in a water basin. The feeder receives an inverted bottle filled with water when inverted therein and has a longitudinal slot adjacent to the trunk which drains spillage against the trunk. The bottom of the feeder is open and supports the neck of the bottle with its mouth above the level of the lower end of the trunk. The feeder is inclined inwardly toward the tree for ease of manipulating and inserting the bottle with the weight of the elevated butt end of the bottle holding the lower end of the feeder in proper position under pressure in spaced orientation from the tree trunk.

BACKGROUND OF THE INVENTION

It is extremely desirable to water Xmas trees to reduce fire hazard in homes. A well watered tree will not readily ignite and the essential reason why Xmas trees are not watered in most cases, is the lack of ease and convenience in accomplishing the task, without damage to carpeting, floors and presents that are generally around Xmas trees. The difficulty of repeatedly pouring water in conventional ways into basins that are provided in stands is so muddling and inconvenient that it effectively discourages all from doing it except very few who are conscious of Xmas tree fires and their dangers.

SUMMARY OF THE INVENTION

The invention is embodied in a somewhat conical feeder formed from a quarter section of a substantially circular or square sheet metal blank as stamped either from strip stock with hemicircular portions alternately arranged economically longitudinally of the strip or from square portions therealong. The blank is roll and fold-formed to provide a somewhat conical central portion with tab means at the large end for supporting the conical portion at an incline or a Xmas tree stand with the large end up at a convenient location between branches of a Xmas tree. In this orientation the substantially conical shaped central portion receives only the neck of a soft drink bottle and is provided with a slot extending the length thereof facing the trunk of a tree that is supported in the stand. The feeder at the narrow end is provided with cross members which support the lower end of the bottle and break up the flow of water therefrom.

A further explanation of the invention is related to its use with a Xmas tree stand having a basin with a clamp means above it supporting the tree trunk against lateral movement. The tab means at the big end of the feeder is secured to the clamp means and a conventional soft drink bottle is filled with water and tipped into inverted position in the conical portion where the bottle is loosely held in place with the mouth thereof at the desired water level in the basin. The feeder engages only the neck portion of the bottle and when the visible portion of the bottle is empty, it can be easily removed, refilled and again tipped into its feeding position without spilling a drop on the floor from the time the mouth of the bottle is disposed close above and approaching the feeder opening. No difficulty or inconvenience to the user is experienced in doing this, because of the initial funnel relationship provided by the invention. Once water begins to drain from the tilted bottle it splashes and is provided with the momentum of the moving bottle that aggravates splattering. In the present invention this is controlled by an open slot in the sidewall disposed next to the trunk which receives the main slosh of water and permits it to pass through and against the trunk of the tree without any rebound against other water that is not moving in alignment with the opening. This lateral water not being opposed by a rebound of the main portion of the water is opposed only by a downwardly and inwardly inclined somewhat circular wall which deflects it towards lower portions of the open slot and towards the bottom opening until the bottle is sufficiently and quickly lowered enough for feeding flow to be directed downwardly into the lower opening. With the lateral open slot located next to the tree trunk taking the majority of the preliminary flow before the opening of the bottle is immersed or discharges directly through the lower open end of the feeder gurgling flow from the bottle is redirected without splashing. These nonsplattering attributes are present whether the bottle is inserted into place rapidly or slowly, thereby protecting the area around the stand regardless of the skill of the individual handling the bottle.

A primary object of the invention is to provide an inexpensive means for watering a Xmas tree which can be given away with the sale of a tree, or of a tree stand having a basin therein, and is sufficiently attractive and easy to install and use, that Xmas tree users will readily use them for their own safety or the appearance of the tree and have both benefits without mess or damage to their homes.

IN THE DRAWINGS

THE PREFERRED EMBODIMENT

Figure 1:
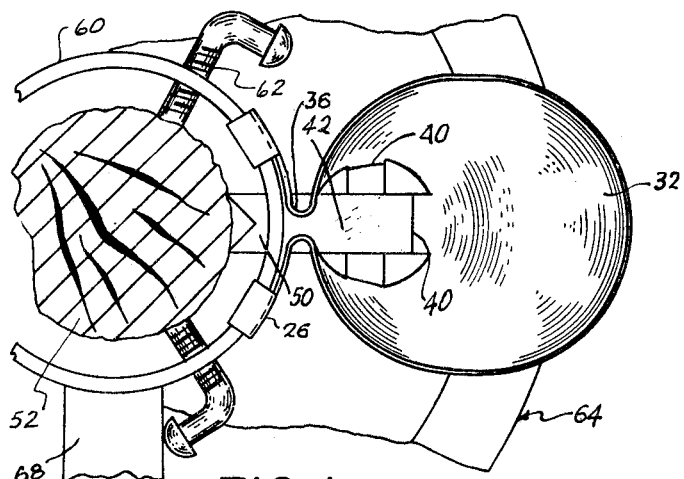
FIG. 1 is a top plan view of a preferred embodiment as mounted in place on the upper tree-support ring of a stand having a basin therebelow.

More particularly, the blank 10 is made from a sheet metal work piece having a 90° angle corner that is defined by two straight sides 12. In the stamping operation the waste material is sheared away at the corner to leave two short ears 14 on opposite sides of a central long finger 16 which terminates in a V-notch defining two points 20. Adjacent to the sides 12 there are provided tabs 22 at the periphery of a circular rim edge 24 which has a radius substantially less than the length of one of said sides 12.

Contemplated fold lines are shown in broken lines, the tabs 22 being folded along two lines 26 to form saddle-like support clamps 28 shown in the other figures. The central portion 30 is curled to form a somewhat conical funnelling portion 32 with portions 34 along the edges thereof bent back upon themselves at lines 36 to provide baffles 36 on opposite sides of a slot 38.

In this form many devices can be shipped in axially nested relationship. The baffles 36 define acute angles with the conical portion 32 at the fold lines 36 and these are received in telescoping relationship with the same structure that is present in identical production feeders.

Figure 3:
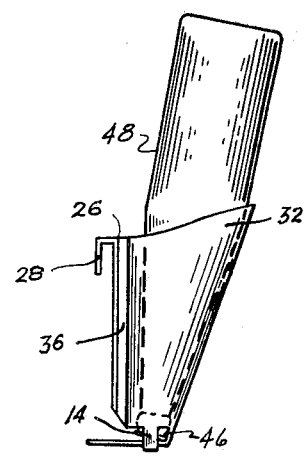
FIG. 3 is a reduced side elevational view of the embodiment shown in FIGS. 1 and 2 with a water feeding bottle in place.
Figure 2:
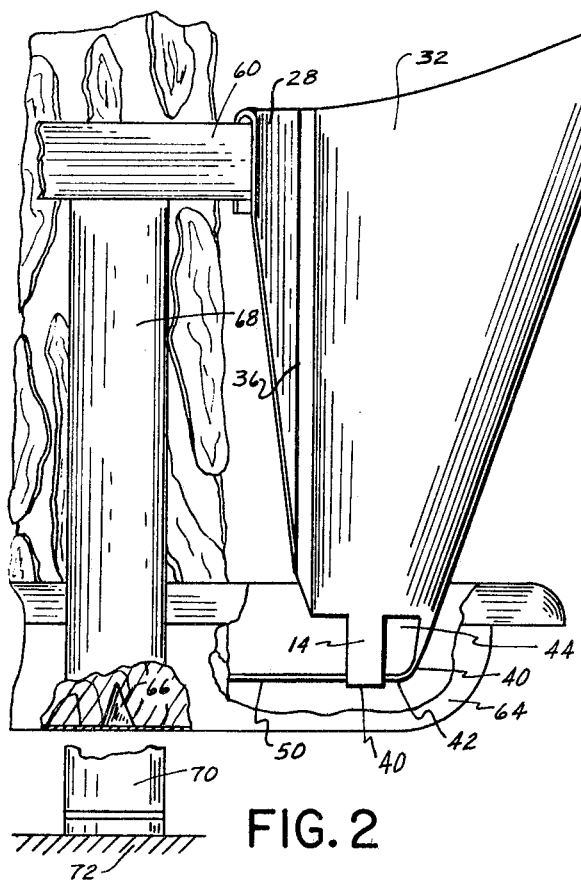
FIG. 2 is a side elevation of the embodiment shown in FIG. 2.
Figure 4:
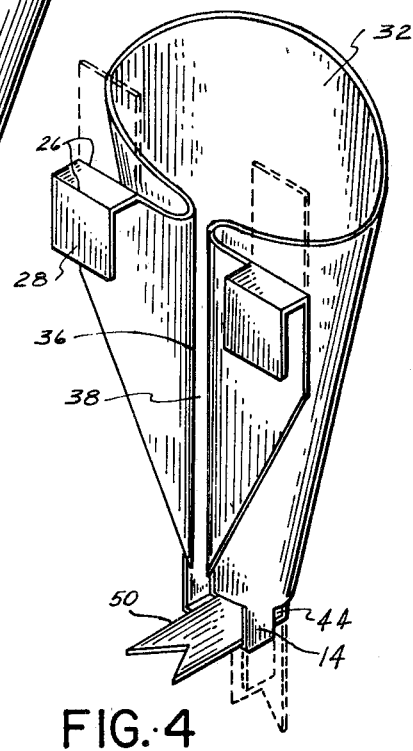
FIG. 4 is a perspective view of the preferred embodiment showing its progressive form. The dotted lines show a stage for nested shipping and its final form for use is shown in full lines.
Figure 5:
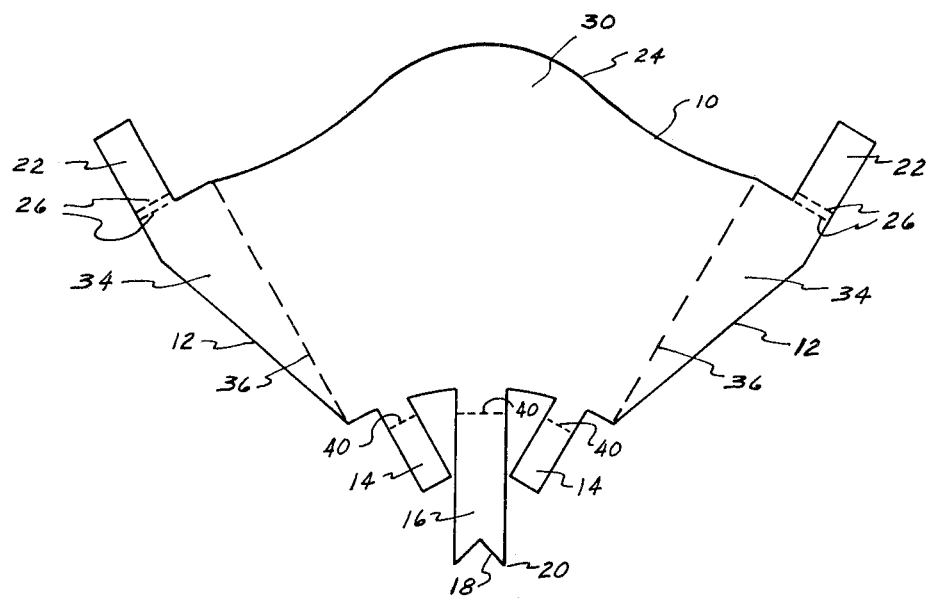
FIG. 5 is a reduced plan view of the stamped sheet metal blank from which the preferred embodiment is formed.

When readied for sale, or after sale, the ears 14 and finger 16 can be finger-bent substantially at right angles on the fold lines 40 into overlapping relationship in any order desired to provide a bottom 42 to be engaged by the mouth rim 46 of a soft drink bottle 48 as shown in FIG. 3. The crossed finger and ears provide lateral openings 44. The central finger 16 extended beyond the plane of the opening 38 to provide a standoff brace 50 terminating in bifurcated points 20 which contact the bark of a Xmas tree trunk 52, as shown in FIG. 1, against lateral slippage. Crossing and securing the ears 14 holds the sides of the opening against outward movement under pressure that may be induced by small end of a bottle. Lateral movement of the support clamps 28 on the ring accommodates bottles with wide bellies adjacent to their tapered neck portion.

In describing the mounting of the device in its operating position, it may be observed that most stands designed for watering a tree have a ring 60 with circumferentially spaced pinpoint screw clamps 62 threaded therethrough to engage the trunk 52 of a Xmas tree in a centering and laterally supported relationship. The lower end of the trunk is generally received on a pin 66 extending upwardly from the bottom of a water receiving basin 64. The basin and ring are supported by vertical struts 68 which extend below the bottom of the basin to provide legs 70 which support the entire assemblage on a floor 72.

In mounting the water feeder, after the tree is properly supported, the clamps 28 are slipped over the ring 60 in wedging relationship and the stand-off brace 50 engages the trunk, ready to receive a bottom therein. A large bottle can be used to fill the basin with water initially above the bottom 42 of the feeder whereupon the desired water level can be maintained by a soft drink bottle filled from time to time and slipped into place in the feeder as already described.

It may be further noted that the trunk may vary in size with the result that the lower end of the feeder will be located further inwardly in a radial direction. Regardless of the trunk size, any spray or splash of water above the water level when a filled bottle is inserted into place is confined to go through the opening 38, against the trunk and any bounce back from the trunk is caught by the baffles 36 and drained into the basin. This makes it possible to vary safely the vertical length of the conical portion 32 in various production models for particular bottles as long as they are supported by their neck for ease of insertion and removal.

Installation is quite easy and handling of the bottle is simple and safe, it being so easy that home owners have no discouragement or excuse for not maintaining a Xmas tree properly watered for safety and appearance, particularly when the feeder means is inexpensive or given to them.

Having thus described the invention it will be observed that modification can be made including the points 20 being preformed on the baffles 36 for nesting, without departing from the invention, the scope of which is commensurate with the appended claims.

What is claimed is:
1. In combination with a Xmas tree stand having a water basin and a trunk centering support means spaced thereabove, a water feeder for receiving an inverted bottle receiving holder comprising:
   means receiving a downwardly inclined tapered neck of a bottle for funneling water into the basin during the time the bottle is being inserted and having a longitudinal narrow opening along one side facing the trunk,
   means for releasably supporting said holder upon said trunk centering means, and
   spacer means on said holder means holding the lower end thereof a spaced distance from the trunk and including an element engaging the trunk to prevent relative lateral movement therebetween.
2. The combination called for in claim 1 in which said spacer means is engaged by the neck end of a bottle and divides the flow of water therefrom for lateral flow into the basin above the lower end of said trunk in the basin.
3. The combination called for in claim 1 in which said bottle holder comprises a frusto-conical shell with the bottom end thereof opening into the basin above the lower end of the trunk.
4. The combination called for in claim 1 including baffle elements marginally along said longitudinal opening facing said trunk.
5. The combination called for in claim 1 including crossed ears at the lower end of the bottle receiving means rigidly supporting the lower ends of the bottle receiving means adjacent said narrow opening.
6. A water feeder for a cut tree trunk comprising a substantially frusto-conical body portion defining a longitudinal opening along one side,
   oppositely extending baffle means bordering said opening a spaced distance from said trunk,
   means for supporting the body portion including tab means on the tops of said baffle means,
   fingers extending axially a predetermined distance from the small end edge of the body portion and terminally bent across each other,
   one of said fingers extending outwardly beyond said opening and baffle means to engage a tree trunk against relative movement and hold said baffle means and opening spaced from the trunk.

References Cited

UNITED STATES PATENTS

| | | | |
|---|---|---|---|
| 1,080,460 | 12/1913 | Kleckner | 47—57.5 |
| 2,938,304 | 5/1960 | Thomas et al. | 47—57.5 |
| 3,302,324 | 2/1967 | MacDonald et al. | 47—38 XR |

FOREIGN PATENTS 1,052,652   3/1959   Germany.

ROBERT E. BAGWILL, Primary Examiner

U.S. Cl. X.R.

248—44; 47—57.5